J. C. DURBIN.
MEAL-BIN.

No. 195,809. Patented Oct. 2, 1877.

WITNESSES:
G. Dieterich
A. F. Terry

INVENTOR:
J. C. Durbin
BY
ATTORNEYS.

UNITED STATES PATENT OFFICE.

JOHN C. DURBIN, OF COLUMBUS JUNCTION, IOWA.

IMPROVEMENT IN MEAL-BINS.

Specification forming part of Letters Patent No. 195,809, dated October 2, 1877; application filed March 19, 1877.

*To all whom it may concern:*

Figure 1:
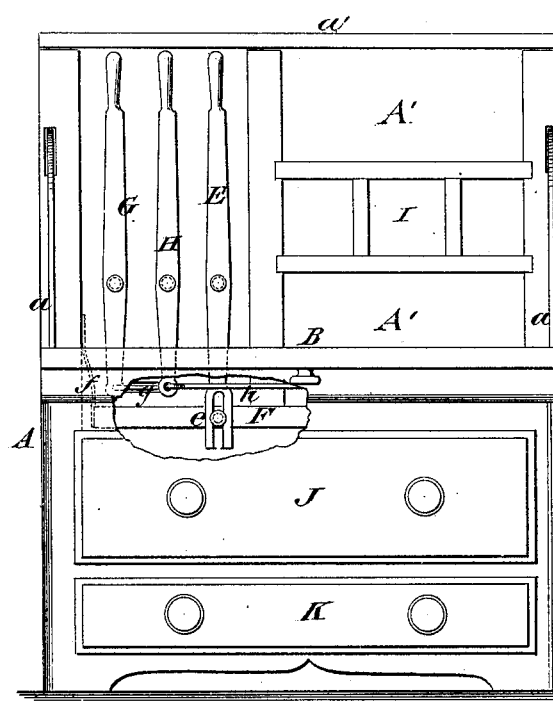
Figure 2:
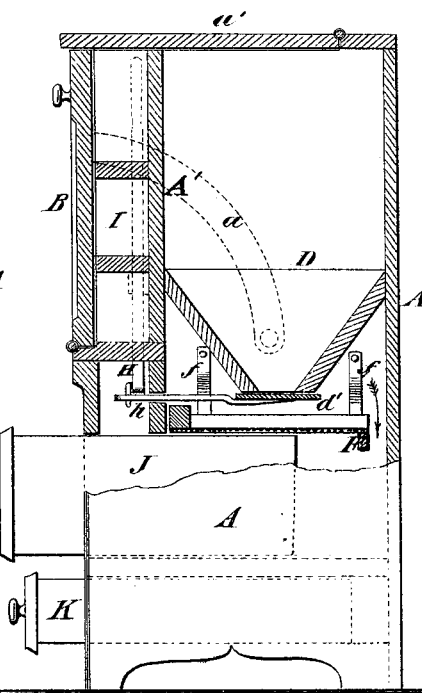

Be it known that I, JOHN C. DURBIN, of Columbus Junction, in the county of Louisa and State of Iowa, have invented a new and Improved Flour-Chest, of which the following is a specification:

In the accompanying drawing, Figure 1 represents a front view, with parts broken out, of my improved flour-chest. Fig. 2 is a side elevation, partly in vertical transverse section; and Fig. 3, a top view of the same with top lid and molding-board in open position.

Similar letters of reference indicate corresponding parts.

The object of this invention is to furnish for kitchen use an improved flour-chest for storing the flour, sifting the same, and providing receptacles for the different articles, the same having a hinged molding-board and space for all the parts required for making bread, pastry, &c., in one convenient piece of furniture.

The invention will first be described in connection with the drawing, and then pointed out in the claims.

In the drawing, A represents a flour-chest of suitable size, and B the hinged molding-board, which serves to close the upper part of the chest. C and D are bins for receiving the flour, and discharge it, by hopper-shaped bottoms with slides or cut-offs $d'$, onto a reciprocating sieve, F, that is hung to springs $f$, and operated in conjunction with the same by a lever, E, which is pivoted to the sieve and fulcrumed to a partition-wall, A', parallel to, and at some distance back of, the molding-board, when the same is in closed position.

The swinging slides or cut-offs $d'$ are operated by connecting-arms $h$ and fulcrumed levers H and G, arranged near lever E on the partition-wall.

The space between the partition A' and molding-board B which is not taken up by the levers is arranged with shelves and drawers, if desired, for the storage of the rolling-pin, cake-cutters, baking-powders, and other articles required for making bread.

Figure 3:
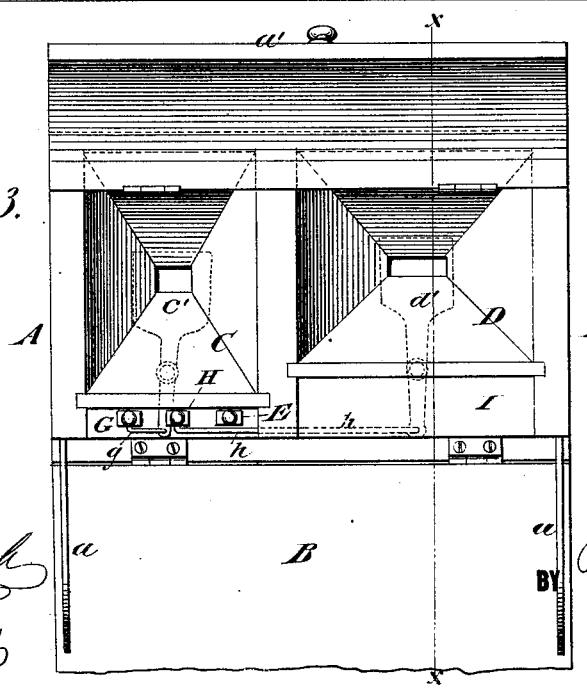

The molding-board B is hinged to the front part of the flour-chest, and guided by curved arms $a$, that run in guide-slots and grooves of the chest, the molding-board B being supported in horizontal position by stop-pins at the ends of the arms $a$, as shown in Figs. 1 and 3. A hinged lid, $a'$, closes the top part of the flour-chest, and admits the refilling of the bins.

Sliding drawers J and K are arranged below the sieve F, the upper drawer, J, being partitioned off to provide a separate space for the flour of each bin. The rear edge of the sieve is open to admit the passage of the bran over the same, which drops through a space formed between the upper shorter drawer J and the back wall of the flour-chest into the lower bran-drawer K, that is of less height than the upper flour-drawer. The bran is taken out from time to time, as required.

The required quantity of sifted flour may be readily obtained at any moment by operating the cut-off from the bottom opening of the hopper and shaking the sieve by its operating-lever. After use the molding-board is swung up into closed position, so as to cover the interior parts and form therewith a compact flour-chest, with all the devices necessary for making bread and other articles.

Having thus described my invention, I claim as new and desire to secure by Letters Patent—

1. The combination, in a flour-chest, with a sieve, F, of the springs $f$ and lever E, arranged as and for the purpose described.

2. The reciprocating sieve F, being open at the rear edge, in combination with the shorter flour-drawer J and longer bran-drawer, the flour-drawer forming with the rear wall a space for dropping the bran into the lower drawer, substantially as described.

JOHN C. DURBIN.

Witnesses:
  JOHN A. FORLINE,
  C. D. ROBINSON.